US005961583A

United States Patent [19]

Van Fleet

[11] Patent Number: 5,961,583

[45] Date of Patent: Oct. 5, 1999

[54] METHOD AND SYSTEM FOR USING THE EVENT WAIT LIST ANCHOR AS A LOCK FOR EVENTS

[75] Inventor: James William Van Fleet, Austin, Tex.

[73] Assignee: International Business Machines Corporation, Armonk, N.Y.

[21] Appl. No.: 08/755,274

[22] Filed: Nov. 22, 1996

[51] Int. Cl.[6] .......... G06F 9/00

[52] U.S. Cl. .......... 709/102; 709/100

[58] Field of Search .......... 395/670, 672, 395/673, 674; 709/100, 102, 103, 104

[56] References Cited

U.S. PATENT DOCUMENTS

| | | | |
|---|---|---|---|
| 4,395,757 | 7/1983 | Bienvenu et al. | 395/674 |
| 5,010,482 | 4/1991 | Keller et al. . | |
| 5,303,368 | 4/1994 | Kotaki . | |
| 5,377,352 | 12/1994 | Tanaka et al. . | |
| 5,504,899 | 4/1996 | Raz . | |
| 5,630,128 | 5/1997 | Farrell et al. | 395/673 |

*Primary Examiner*—Majid A. Banankhah
*Attorney, Agent, or Firm*—Richard A. Henkler; Leslie A. Van Leeuwen

[57] ABSTRACT

A method and apparatus for maintaining a list for threads which are awaiting their occurrence of event. First a thread is detected that desires to perform some type of action based upon the occurrence of an event. Thereafter, the value of an event list anchor is set to indicate that it is currently unavailable. Thereafter, the value of the event list anchor set equal to the identification of the second thread.

20 Claims, 7 Drawing Sheets

Set_Event_Locked — 700
Get current value of Event List Anchor — 702
Current Value = Event_Locked — 704 (YES / NO)
Automatically Set Event List Anchor = Event_Locked — 706
Return Current Value — 708

METHOD AND SYSTEM FOR USING THE EVENT WAIT LIST ANCHOR AS A LOCK FOR EVENTS

BACKGROUND

1. Field of the Present Invention

The present invention generally relates to data processing systems, and more specifically to methods and systems that use alternative lock methods for locking access to an event.

2. History of Related Art

The evolution of the computer industry has been driven by the insatiable appetite of the consumer for ever increased speed and functionality. One species that the evolution has created is the multi-processor computer.

The multi-processor systems, in similarity to other computer systems, have many different areas that are ripe for improvement. One such area ripe for improvement evolves within the operating systems for such multi-processor environments (e.g. UNIX, AIX, etc.). More specifically, in such a multi-processor environment, locks are used by the operating system in order to serialize access to resources.

One such resource is an Event List Anchor, and the list (event list) associated with the Event List Anchor. In general, an Event List Anchor, is defined in UNIX as an Event Identifier.

The methods currently used today for accessing the event list result in serialization. Specifically, current methods use a single lock, such as Proc_Base_Lock (AIX), to serialize the event list, and potentially, to serialize other fields not in the event list.

It would, therefore, be a distinct advantage to have a method and system that would serialize only the event list itself. The present invention provides such a method and system.

SUMMARY OF THE PRESENT INVENTION

In one aspect, the present invention is a method of maintaining a list for threads which are awaiting the occurrence of an event. The method includes the step of detecting that a first thread desires to perform some type of action based upon the occurrence of an event. The method also includes the step of setting the value of an event list anchor to indicate that it is currently unavailable. The method further includes the step of setting the value of the event list anchor equal to the identification of the first thread.

BRIEF DESCRIPTION OF THE DRAWINGS

The present invention will be better understood and its numerous objects and advantages will become more apparent to those skilled in the art by reference to the following drawings, in conjunction with the accompanying specification, in which.

DETAILED DESCRIPTION OF THE PREFERRED EMBODIMENT OF THE PRESENT INVENTION

In the following description, numerous specific details are set forth such as specific word or byte lengths, etc., to provide a thorough understanding of the present invention. However, it will be obvious to those of ordinary skill in the art that the present invention can be practiced without such specific details. In other instances, well-known circuits have been shown in block diagram form in order not to obscure the present invention in unnecessary detail. For the most part, details concerning timing considerations and the like have been omitted inasmuch as such details are not necessary to obtain a complete understanding of the present invention, are within the skills of persons of ordinary skill in the relevant art.

Figure 1:
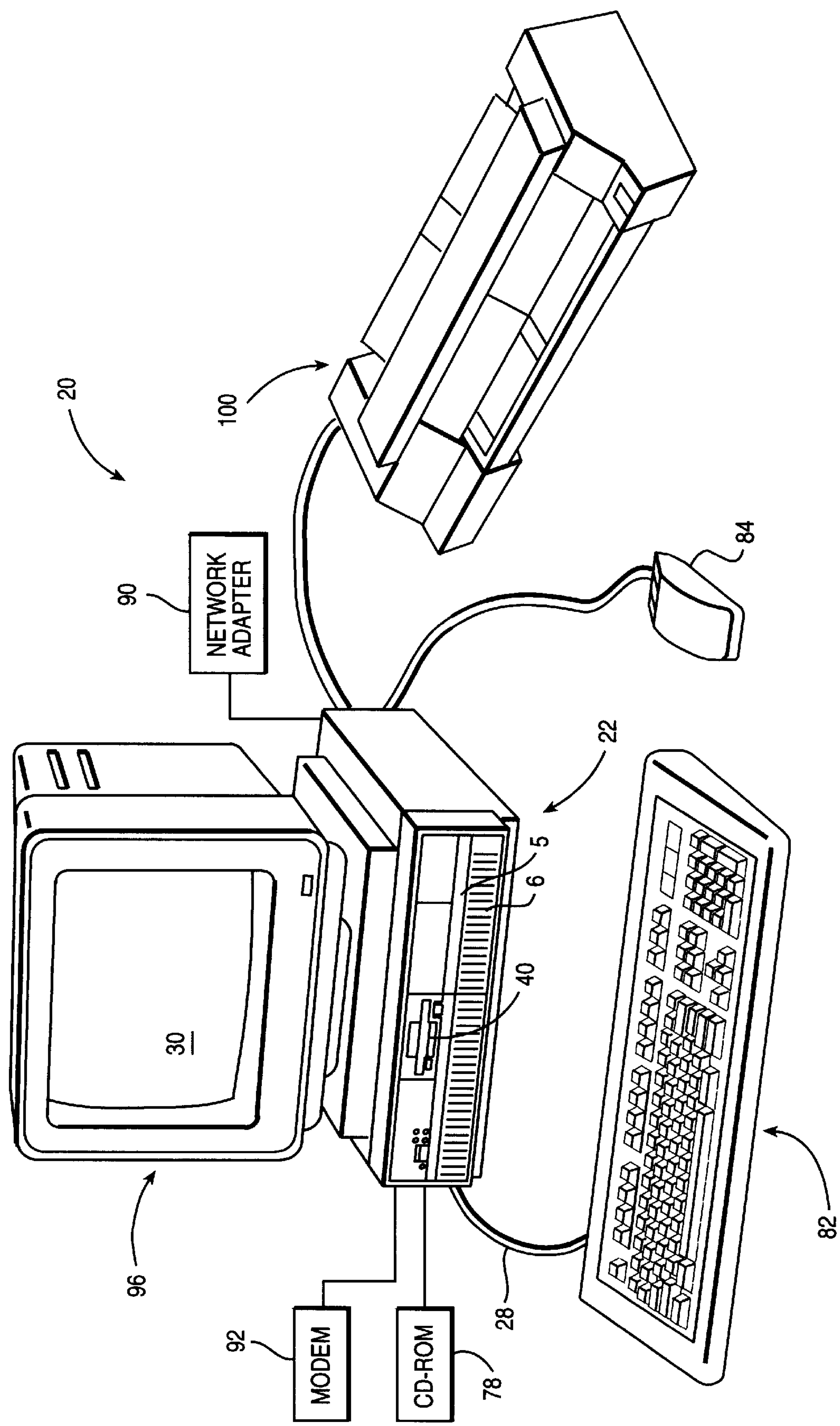
FIG. 1 is a schematic diagram of a typical multi-processor computer system in which the present invention can be practiced.

Reference now being made to FIG. 1, a data processing system 20 is shown in which the present invention can be practiced. The data processing system 20 includes processor 22, keyboard 82, and display 96. Keyboard 82 is coupled to processor 22 by a cable 28. Display 96 includes display screen 30, which may be implemented using a cathode ray tube (CRT) a liquid crystal display (LCD) an electrode luminescent panel or the like. The data processing system 20 also includes pointing device 84, which may be implemented using a track ball, a joy stick, touch sensitive tablet or screen, track path, or as illustrated a mouse. The pointing device 84 may be used to move a pointer or cursor on display screen 30. Processor 22 may also be coupled to one or more peripheral devices such as modem 92, CD-ROM 78, network adapter 90, and floppy disk drive 40, each of which may be internal or external to the enclosure or processor 22. An output device such as printer 100 may also be coupled with processor 22.

It should be noted and recognized by those persons of ordinary skill in the art that display 96, keyboard 82, and pointing device 84 may each be implemented using anyone of several known off-the-shelf components.

Figure 2:
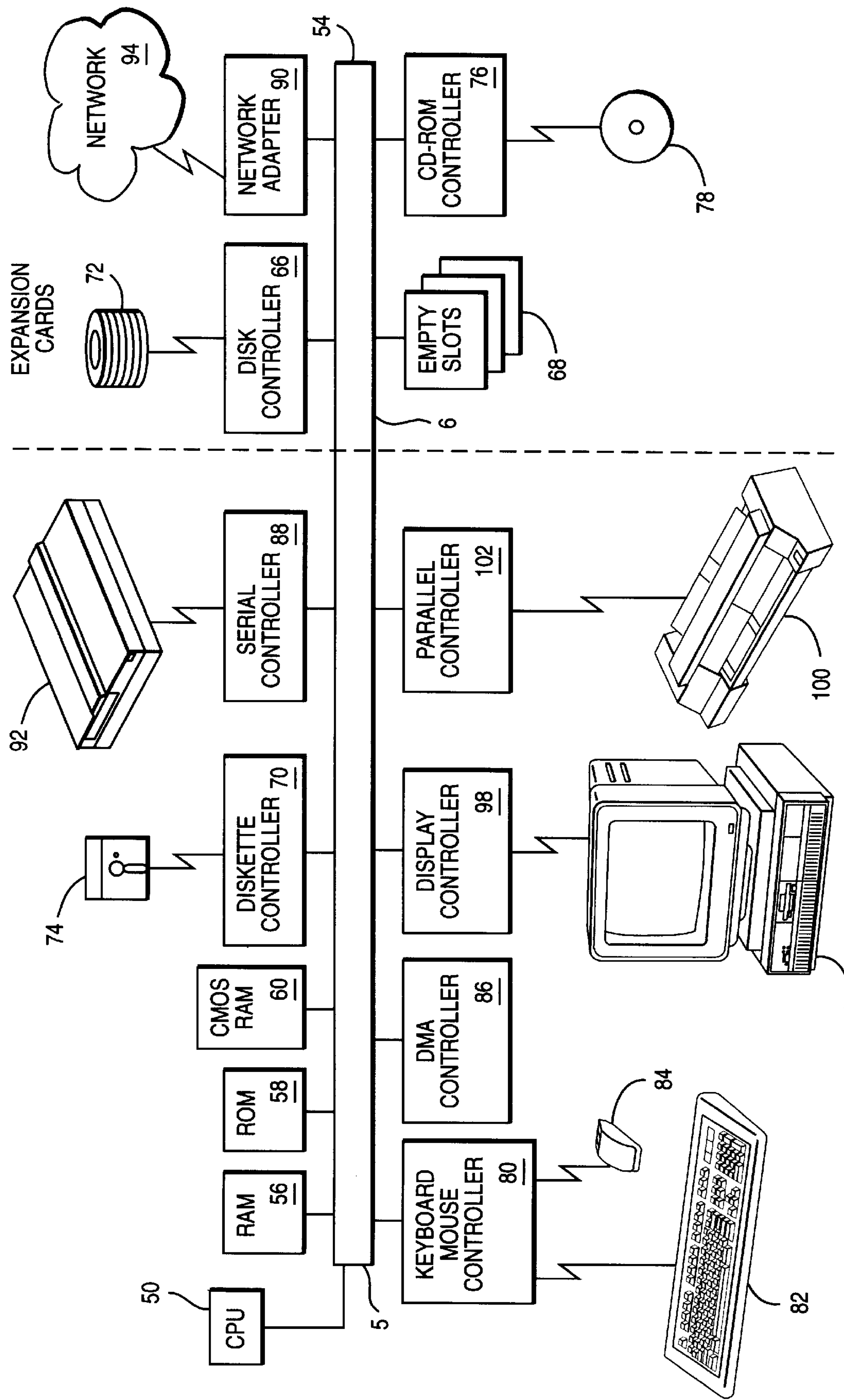
FIG. 2. is a high level block diagram illustrating selected components that can be included in the data processing system of FIG. 1 according to the teachings of the present invention.

Reference now being made to FIG. 2, a high level block diagram is shown illustrating selected components that can be included in the data processing system 20 of FIG. 1 according to the teachings of the present invention. The data processing system 20 is controlled primarily by computer readable instructions, which can be in the form of software, wherever, or by whatever means such software is stored or accessed. Such software may be executed within the Central Processing Unit (CPU) 50 to cause data processing system 20 to do work.

Memory devices coupled to system bus 5 include Random Access Memory (RAM) 56, Read Only Memory (ROM) 58, and non-volatile memory 60. Such memories include circuitry that allows information to be stored and retrieved. ROMs contain stored data that cannot be modified. Data stored in RAM can be changed by CPU 50 or other hardware devices. Non-volatile memory is memory that does not loose data when power is removed from it. Non-volatile memories include ROM, EPROM, flash memory, or battery-pack CMOS RAM. As shown in FIG. 2, such battery-pack CMOS RAM may be used to store configuration information.

An expansion card or board is a circuit board that includes chips and other electronic components connected that adds functions or resources to the computer. Typically expansion cards add memory, disk-drive controllers 66, video support, parallel and serial ports, and internal modems. For lap top, palm top, and other portable computers, expansion cards usually take the form of PC cards, which are credit card-sized devices designed to plug into a slot in the side or back of a computer. An example such a slot is PCMCIA slot (Personal Computer Memory Card International Association) which defines type 1, 2 and 3 card slots. Thus, empty slots 68 may be used to receive various types of expansion cards or PCMCIA cards.

Disk controller 66 and diskette controller 70 both include special purpose integrated circuits and associated circuitry that direct and control reading from and writing to hard disk drive 72, and a floppy disk or diskette 74, respectively. Such disk controllers handle task such as positioning read/write head, mediating between the drive and the CPU 50, and controlling the transfer information to and from memory. A single disk controller may be able to control more than one disk drive.

CD-ROM controller 76 may be included in data processing 20 for reading data from CD-ROM 78 (compact disk read only memory). Such CD-ROMs use laser optics rather then magnetic means for reading data.

Keyboard mouse controller 80 is provided in data processing system 20 for interfacing with keyboard 82 and pointing device 84. Such pointing devices are typically used to control an on-screen element, such as a cursor, which may take the form of an arrow having a hot spot that specifies the location of the pointer when the user presses a mouse button. Other pointing devices include the graphics tablet, the stylus, the light pin, the joystick, the puck, the trackball, the trackpad, and the pointing device sold under the trademark "TrackPoint" by IBM.

Communication between processing system 20 and other data processing systems may be facilitated by serial controller 88 and network adapter 90, both of which are coupled to system bus 5. Serial controller 88 is used to transmit information between computers, or between a computer and peripheral devices, one bit at a time over a single line. Serial communications can be synchronous (controlled by some standard such as a clock) or asynchronous (managed by the exchange of control signals that govern the flow of information). Examples of serial communication standards include RS-232 interface and the RS-422 interface. As illustrated, such a serial interface may be used to communicate with modem 92. A modem is a communication device that enables a computer to transmit information over a standard telephone line. Modems convert digital computer signals to interlock signals suitable for communications over telephone lines. Modem 92 can be utilized to connect data processing system 20 to an on-line information service, such as an information service provided under the service mark "PRODIGY" by IBM and Sears. Such on-line service providers may offer software that may be down loaded into data processing system 20 via modem 92. Modem 92 may provide a connection to other sources of software, such as server, an electronic bulletin board, the internet or World Wide Web.

Network adapter 90 may be used to connect data processing system 20 to a local area network 94. Network 94 may provide computer users with means of communicating and transferring software and information electronically. Additionally, network 94 may provide distributed processing, which involves several computers in the sharing of workloads or cooperative efforts in performing a task.

Display 96, which is controlled by display controller 98, is used to display visual output generated by data processing system 20. Such visual output may include text, graphics, animated graphics, and video. Display 96 may be implemented with CRT-based video display, an LCD-based flat panel display, or a gas plasma-based flat-panel display. Display controller 98 includes electronic components required to generate a video signal that is sent to display 96.

Printer 100 may be coupled to data processing system 20 via parallel controller 102. Printer 100 is used to put text or a computer-generated image on paper or on another medium, such as transparency. Other type of printers may include an image setter, a plotter, or a film recorder.

Parallel controller 102 is used to send multiple data and control bits simultaneously over wires connected between system bus 5 and another parallel communication device, such as printer 100.

CPU 50 fetches, decodes, and executes instructions, and transfers information to and from other resources via the computers main data-transfer path, system bus 5. Such a bus connects the components in a data processing system 20 and defines the medium for data exchange. System bus 5 connects together and allows for the exchange of data between memory units 56, 58, and 60, CPU 50, and other devices as shown in FIG. 2.

Figure 3:
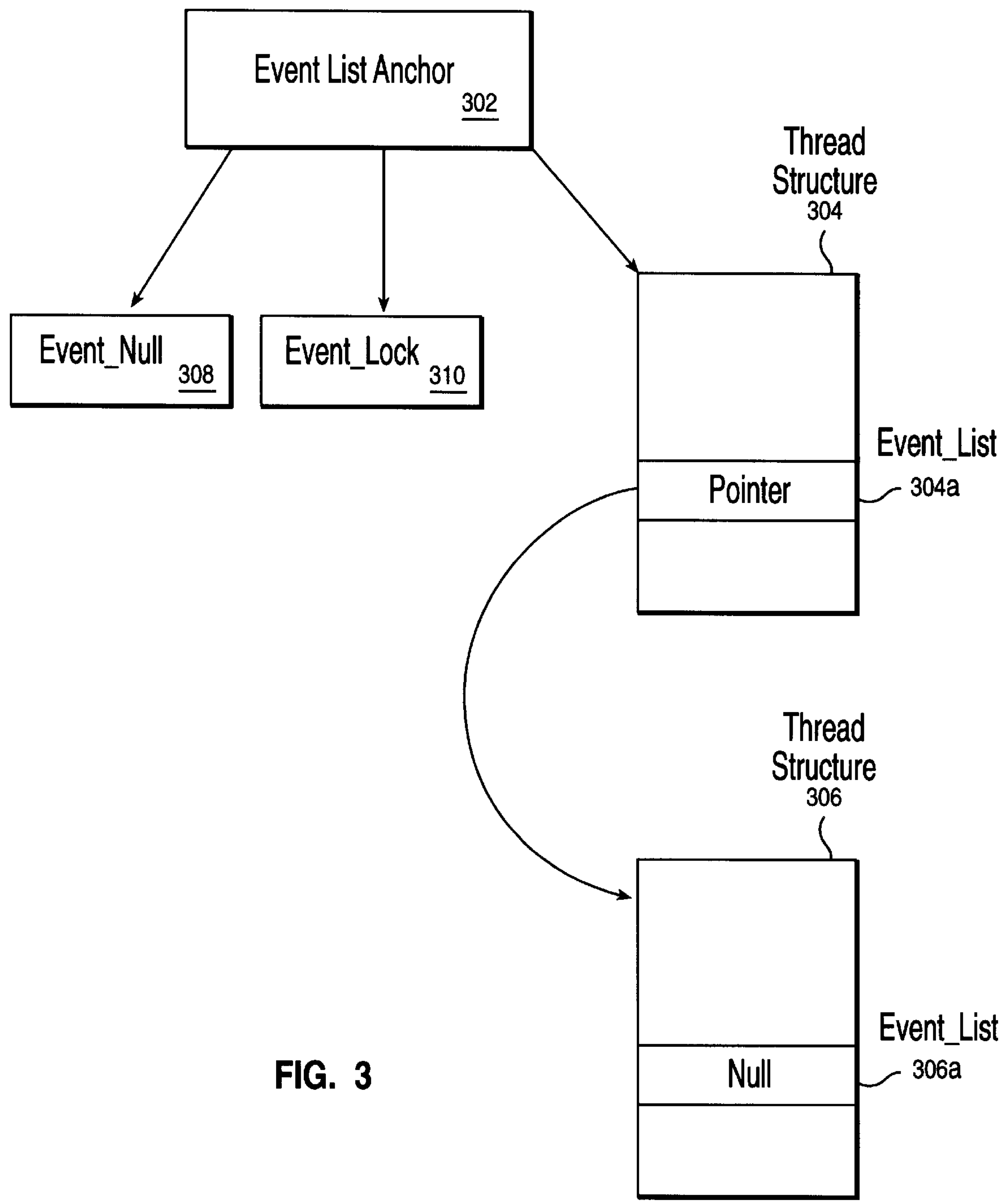
FIG. 3 is a block diagram illustrating the Event List Anchor of the operating system of FIG. 1 according to the teachings of the present invention.

Reference now being made to FIG. 3, a block diagram is shown illustrating the Event List Anchor 302 of the operating system (not shown) of FIG. 1 according to the teachings of the present invention. Specific information concerning the Event List Anchor and other related UNIX structures can be found in "UNIX Internals", by M. C. Shaw and S. S. Shaw, published by TAB Books, and which is hereby incorporated by reference herein.

In general, the UNIX operating system uses an Event List Anchor, such as Event List Anchor 302, in order to maintain a list of thread structures that are currently awaiting for the occurrence of the representative event. As previously explained, prior art methods used a single lock in order to serialize the event list. The disadvantages associated with the use of such a lock is that it could potentially serialize other fields not in the event list itself.

In the preferred embodiment of the present invention, each Event List Anchor 302 is used as a lock for the event list it represents.

More specifically, in the preferred embodiment, the Event List Anchor 302 can have three values: (1) Event_Null, (2) Event_Lock, and (3) Thread_ID. If the Event List Anchor 302 has a value of Event_Null, then this indicates that there are no threads currently awaiting for the represented event to occur. If the Event List Anchor 302 has a value equal to Event_Lock, then this indicates that some action is currently being under taken with respect to the Event List Anchor 302.

For example, the Event List Anchor 302, as shown in FIG. 3, can have a value of Event_Null 308, a value of Event_Lock 310, or it could point, via a Thread_ID, to a thread structure, such as thread structure 304. Thread structure 304 includes an Event List 304*a* that can have either a value of null, or point to another thread structure, such as thread structure 306. Thread structure 306 also contains an Event_List 306a that can have a value of null or point to an additional thread structure, thus, forming the event list chain. More specific information concerning the use of the Event List Anchor as a lock for the represented event is explained hereinafter in connection with FIG. 4.

Figure 4:
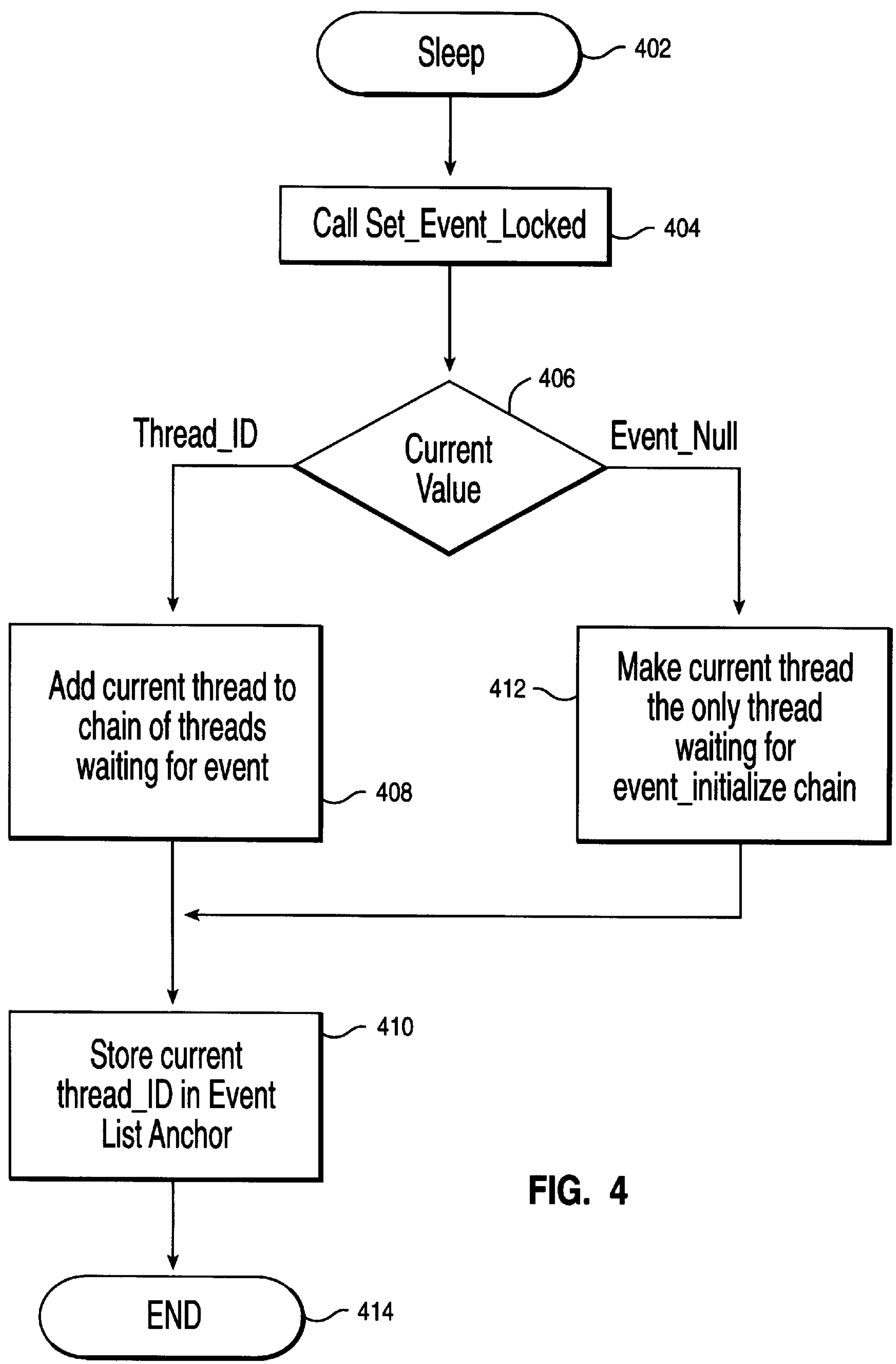
FIG. 4 is a flowchart illustrating the use of the Event List Anchor of FIG. 1 when a thread is put to sleep according to the teachings of the present invention.

Reference now being made to FIG. 4, a flowchart is shown illustrating the use of the Event List Anchor of FIG. 1 when a thread is put to sleep according to the teachings of the present invention. It should be noted that a thread is placed into sleep mode whenever an event that it desires to use has not occurred. It should also be noted that the method described hereinafter represents the portion of the sleep routine of AIX as modified to use the Event List Anchor according to the teachings of the present invention. The method begins at step 402 upon the call by a thread to the sleep routine. Thereafter, the method proceeds to step 404 where the procedure Set_Event_Locked is called. The procedure Set_Event_Locked is explained in greater detail in connection with FIG. 7. The Set_Event_Locked procedure returns the current value stored in the Event List Anchor 302, which can be, at this point, either Event_Null or Thread_ID. The method then proceeds to step 406 where it is determined whether or not the returned value "current value" is equal to Event_Null or Thread_ID. If, at step 406, it is determined that the current value is equal to a Thread_ID, then the method proceeds to step 408. If, however, at step 406, it is determined that the current value is equal to Event_Null, then the method proceeds to step 412.

At step 408, the current thread (i.e. the thread making the call) is added to the chain of threads in the Event List waiting for the representative event to occur. Thereafter, the method proceeds to step 410.

At step 412, the current thread is made to represent the only thread waiting for the Event_Initialize Chain. Thereafter, the method proceeds to step 410.

At step 410, a pointer to the current Thread_ID is synchronously stored in the Event List Anchor 302, thus effectively unlocking the Event List Anchor via storing a valve other than Event_Locked. Thereafter, the method proceeds to end at step 414.

Those skilled in the art understand that after the occurrence of the event, the sleeping threads must be awakened. The method for using the Event List Anchor 302 in conjunction with this wake up is explained hereinafter in connection with FIG. 5.

Figure 5:
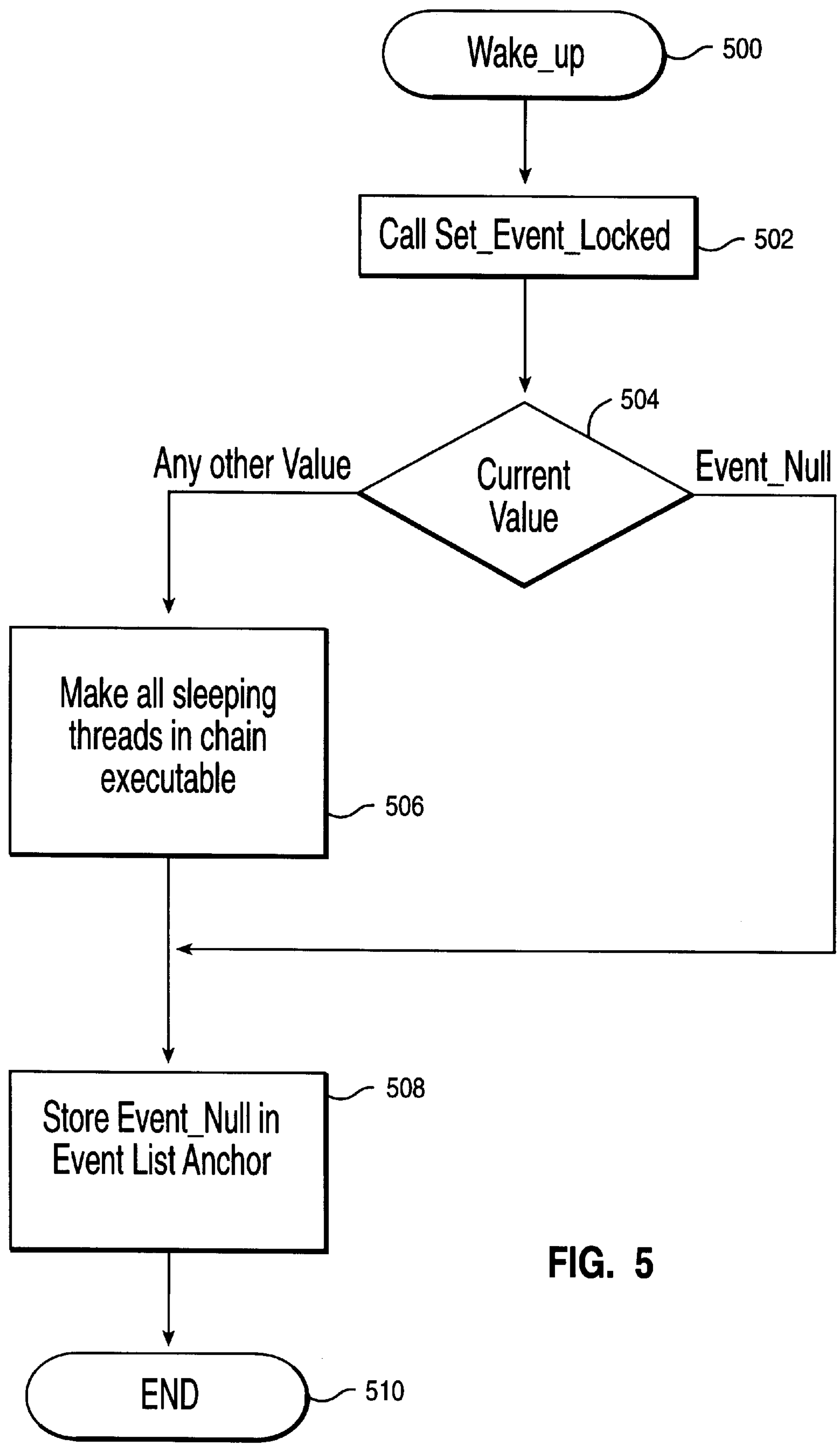
FIG. 5 is flowchart illustrating the use of the Event List Anchor to awaken the threads which were previously put to sleep in FIG. 4 according to the teachings, of the present invention.

Reference now being made to FIG. 5, a flowchart is shown illustrating the use of the Event List Anchor to awaken the threads which were previously put to sleep in FIG. 4 according to the teachings of the present invention. It should also be noted that the method described hereinafter represents the portion of the Wake_Up routine of AIX as modified to use the Event List Anchor according to the teachings of the present invention. The method begins at step 500 where the Wake-Up procedure is called. The method then proceeds to step 502 where the procedure Set_Event_Locked is called, and as previously explained, returns the current value of the event lock anchor 302. Thereafter, the method proceeds to step 504 where the current value of the event lock anchor 302 is compared to determine whether or not it is equal to Event_Null or any other value. If, at step 504, it is determined that the current value of the event lock anchor 302 is equal to Event_Null, then the method proceeds to step 508. If, however, at step 504, it is determined that the current value is not equal to Event_Null, then the method proceeds to step 506.

At step 506, all of the sleeping threads in the event list chain (e.g. 304 and 306) are awakened in order to execute. Thereafter, the method proceeds to step 508. At step 508, a value equal to Event_Null is synchronously stored in the Event List Anchor 302. Thereafter, the method proceeds to end at step 510.

Figure 6:
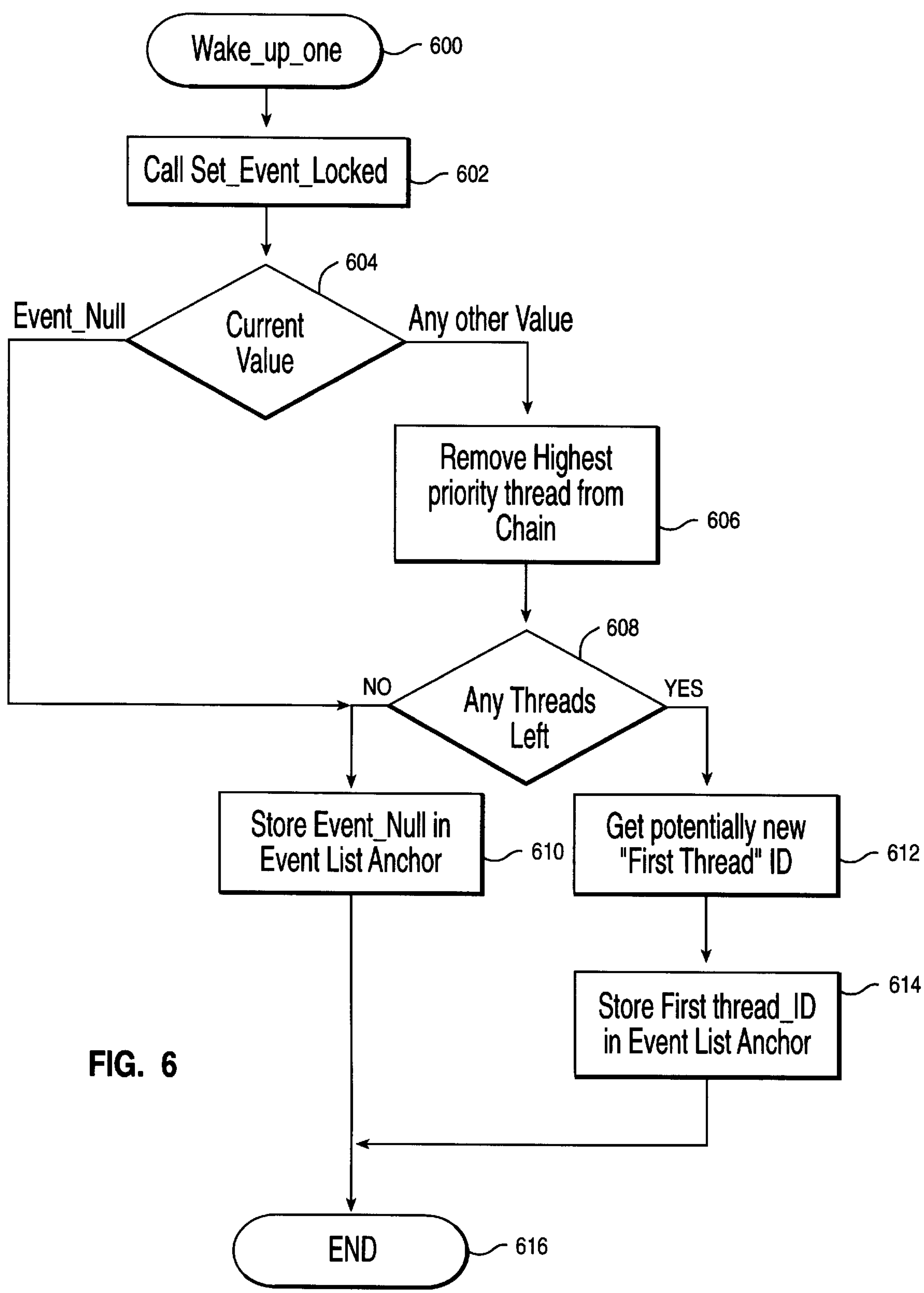
FIG. 6 is flowchart illustrating an alternative embodiment of the present invention in which the threads previously put to sleep in FIG. 4 are awakened based upon a priority basis according to the teachings of the present invention.

Reference now being made to FIG. 6, a flowchart is shown illustrating an alternative embodiment of the present invention in which the threads previously put to sleep in FIG. 4 are awakened based upon a priority basis according to the teachings of the present invention. The method begins at step 600 where the procedure Wake_Up_Done is called. Thereafter, the method proceeds to step 602 where the procedure Set_Event_Locked is called. The method then proceeds to step 604 where the current value of the Event first anchor 302 is compared to Event_Null. If, at step 604, the current value is equal to Event_Null, then the method proceeds to step 610. If, however, at step 604, the current value is equal to any other value than Event_Null, then the method proceeds to step 606.

At step 606, the highest priority sleeping thread in the event list chain is made executable and removed from the event list, and the method proceeds to step 608. At step 608, it is determined whether or not any sleeping threads are remaining in the event list chain. If, at step 608, it is determined that sleeping threads do exist in the event list chain, then the method proceeds to step 612. If, however, at step 608, it is determined that no further threads exist in the event list chain, then the method proceeds to step 610.

At step 612, a new first Thread_ID, if required, is retrieved from the event list chain, and the method proceeds to step 614. At step 614, the first Thread_ID is synchronously stored in the Event List Anchor 302, and the method proceeds to end at step 616.

At step 610, a value of Event_Null is synchronously stored in the Event List Anchor 302, and the method proceeds to end at step 616.

Figure 7:
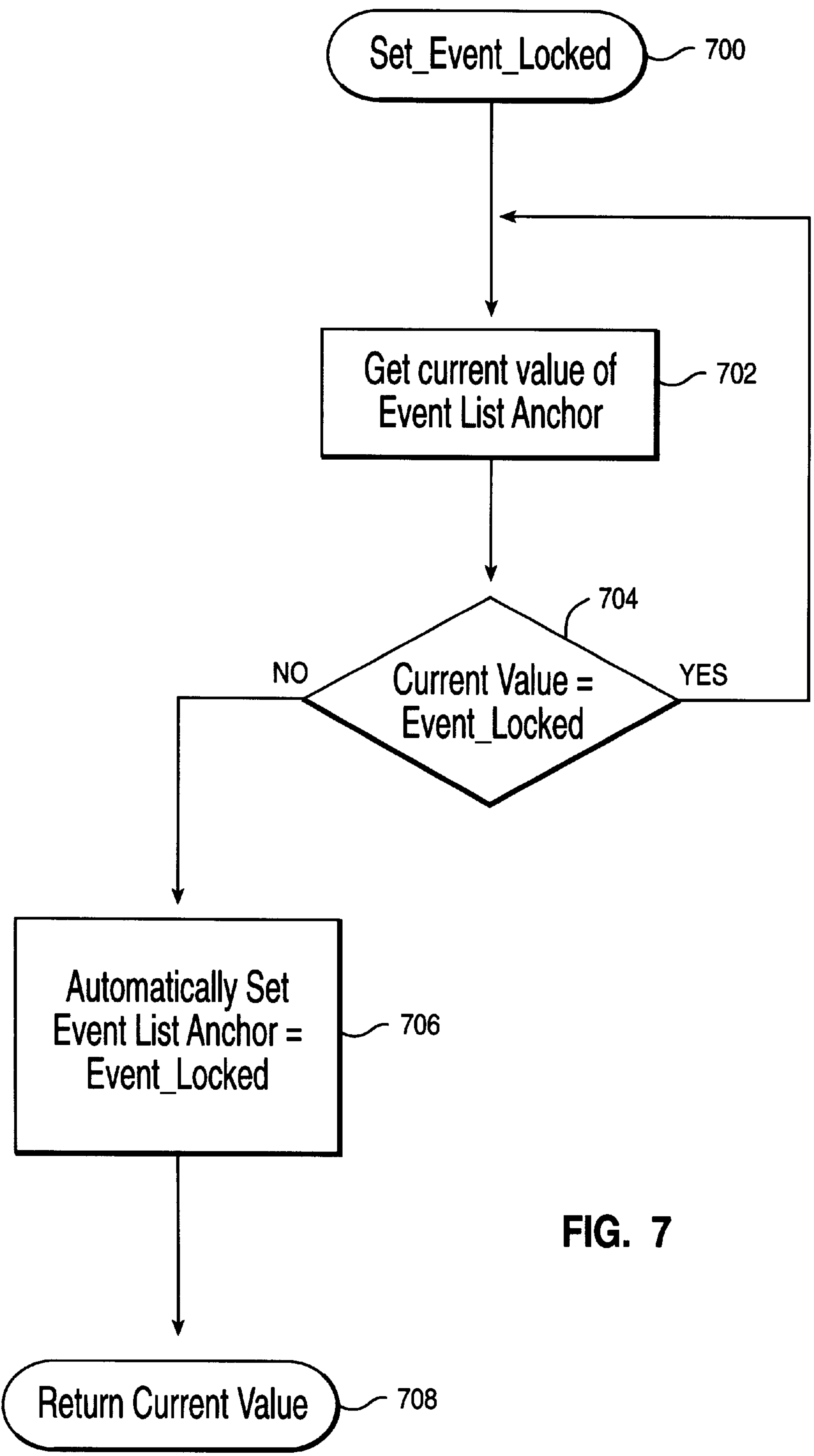
FIG. 7 is a flowchart illustrating the procedure Set_Event_Locked called by the wake up and sleep methods of FIG. 5, 6, and 4, respectively according to the teachings of the present invention.

Reference now being made to FIG. 7, a flowchart is shown illustrating the procedure Set_Event_Locked called by the wake up and sleep methods of FIGS. 5, 6, and 4 respectively, according to the teachings of the present invention. The method begins at step 700, and proceeds to step 702 where the current value of the Event List Anchor 302 is retrieved. Thereafter, the method proceeds to step 704 where it is determined whether or not the current value equals Event_Locked. If, at step 704, it is determined that current value is equal to Event_Locked, then the method proceeds back to step 702 and repeats the above noted steps from that point. If, however, at step 704, it is determined that the current value does not equal Event_Locked, then the method proceeds to step 706.

At step 706, the Event List Anchor 302 is atomically set equal to Event_Locked. Hereinafter, atomic refers to an operation which attempts a read or write to an address in storage uninterrupted by any other access to that address.

Thereafter, the method proceeds to step 708 where the current value of the Event List Anchor 302 is returned to the calling procedure, and the method proceeds to end.

It is thus believed that the operation and construction of the present invention will be apparent from the foregoing description. While the method and system shown and described has been characterized as being preferred, it will be readily apparent that various changes and/or modifications could be made wherein without departing from the spirit and scope of the present invention as defined in the following claims.

What is claimed is:

1. A method of managing threads in a data processing system, comprising:

detecting that a first thread desires to perform some type of action, based upon the occurrence of an event;

locking an event list by setting an event list anchor equal to a first value, wherein the event list anchor is a head of the event list, and wherein the first value indicates that the event list is currently locked; and setting the event list anchor equal to an identification of the first thread, wherein said setting the event list anchor equal to the identification of the first thread causes the event list to be unlocked.

2. A method of managing threads according to claim 1, further comprising:

upon the occurrence of the event, locking the event list by setting the event list anchor equal to the first value;

making the first thread executable; and setting the event list anchor equal to a second value, wherein the second value indicates that the event list is empty.

3. A method of managing threads according to claim 1, further comprising:

detecting that a second thread desires to perform some type of action based upon the occurrence of the event;

locking the event list by setting the event list anchor equal to the first value;

adding the second thread to the event list; and setting the event list anchor equal to the identification of the first thread.

4. A method of managing threads according to claim 3, wherein said adding comprises setting a pointer associated with the first thread equal to an identification of the second thread.

5. A method of managing threads according to claim 3, further comprising:

detecting that a third thread desires to perform some type of action based upon the occurrence of the event;

detecting that the event list anchor is equal to the first value;

waiting until the event list anchor is not equal to the first value;

upon detecting that the event list anchor is not equal to the first value, performing the following:

locking the event list by setting the event list anchor equal to the first value;

adding the third thread to the event list; and setting the event list anchor equal to the identification of the first thread.

6. A method of managing threads according to claim 3, further comprising:

upon the occurrence of the event, locking the event list by setting the event list anchor equal to the first value;

making each thread in the event list executable; and setting the event list anchor equal to a second value, wherein the second value indicates that the event list is empty.

7. A method of managing threads according to claim 3, further comprising:

upon the occurrence of the event, locking the event list by setting the event list anchor equal to the first value;

determining a highest priority thread in the event list; and making the highest priority thread executable.

8. A method of managing threads according to claim 7, further comprising:

if the highest priority thread in the event list is the first thread in the list, setting the event list anchor equal to the identification of the second thread.

9. A data processing system, comprising:

means for detecting that a first thread desires to perform some type of action, based upon the occurrence of an event;

means for locking an event list by setting an event list anchor equal to a first value, wherein the event list anchor is a head of the event list, and wherein the first value indicates that the event list is currently locked; and means for unlocking the event list by setting the event list anchor equal to an identification of the first thread.

10. A data processing system according to claim 9, further comprising:

means for making the first thread executable; and means for setting the event list anchor equal to a second value, wherein the second value indicates that the event list is empty.

11. A data processing system according to claim 9, further comprising:

means for detecting that a second thread desires to perform some type of action based upon the occurrence of the event;

means for locking the event list, upon detecting that the second thread desires to perform some type of action, by setting the event list anchor equal to the first value;

means for adding the second thread to the event list; and means for setting the event list anchor equal to the identification of the first thread after the second thread has been added to the event list.

12. A data processing system according to claim 11, further comprising:

means for detecting that a third thread desires to perform some type of action based upon the occurrence of the event;

means for detecting that the event list anchor is equal to the first value;

means for waiting until the event list anchor is not equal to the first value;

means for locking the event list, upon detecting that the event list anchor is not equal to the first value, by setting the event list anchor equal to the first value;

means for adding the third thread to the event list; and means for setting the event list anchor equal to the identification of the first thread after the third thread has been added to the event list.

13. A data processing system according to claim 11, further comprising:

means for locking the event list upon the occurrence of the event, by setting the event list anchor equal to the first value;

means for making each thread in the event list executable; and means for setting the event list anchor equal to a second value, wherein the second value indicates that the event list is empty.

14. A data processing system according to claim 11, further comprising:

means for locking the event list upon the occurrence of the event, by setting the event list anchor equal to the first value; and means for making a selected thread in the event list executable.

15. A computer program product on a computer usable medium, the computer usable medium having computer usable program means embodied therein, the computer usable program means comprising:

means for detecting that a first thread desires to perform some type of action, based upon the occurrence of an event;

means for locking an event list by setting an event list anchor equal to a first value, wherein the event list anchor is a head of the event list, and wherein the first value indicates that the event list is currently locked; and means for unlocking the event list by setting the event list anchor equal to an identification of the first thread.

16. A computer program product according to claim 15, wherein the computer usable program means further comprises:

means for making the first thread executable; and means for setting the event list anchor equal to a second value, wherein the second value indicates that the event list is empty.

17. A computer program product according to claim 15, wherein the computer usable program means further comprises:

means for detecting that a second thread desires to perform some type of action based upon the occurrence of the event;

means for locking the event list, upon detecting that the second thread desires to perform some type of action, by setting the event list anchor equal to the first value;

means for adding the second thread to the event list; and means for setting the event list anchor equal to the identification of the first thread after the second thread has been added to the event list.

18. A computer program product according to claim 17, wherein the computer usable program means further comprises:

means for detecting that a third thread desires to perform some type of action based upon the occurrence of the event;

means for detecting that the event list anchor is equal to the first value;

means for waiting until the event list anchor is not equal to the first value;

means for locking the event list, upon detecting that the event list anchor is not equal to the first value, by setting the event list anchor equal to the first value;

means for adding the third thread to the event list; and means for setting the event list anchor equal to the identification of the first thread after the third thread has been added to the event list.

19. A computer program product according to claim 17, wherein the computer usable program means further comprises:

means for locking the event list upon the occurrence of the event, by setting the event list anchor equal to the first value;

means for making each thread in the event list executable; and means for setting the event list anchor equal to a second value, wherein the second value indicates that the event list is empty.

20. A computer program product according to claim 16, further comprising:

means for locking the event list upon the occurrence of the event, by setting the event list anchor equal to the first value; and means for making a selected thread in the event list executable.

* * * * *

UNITED STATES PATENT AND TRADEMARK OFFICE
CERTIFICATE OF CORRECTION

PATENT NO. : 5,961,583
DATED : Oct. 5, 1999
INVENTOR(S) : James W. Van Fleet

It is certified that error appears in the above-identified patent and that said Letters Patent is hereby corrected as shown below:

Column 6, line 16 please delete "first anchor" and substitute --List Anchor--.

Signed and Sealed this

Twenty-third Day of May, 2000

Attest:

Q. TODD DICKINSON

*Attesting Officer*

*Director of Patents and Trademarks*